United States Patent [19]

Sonstroem

[11] Patent Number: 5,812,319

[45] Date of Patent: Sep. 22, 1998

[54] SACRIFICIAL MICRO-GRATINGS

[75] Inventor: Jaime Sonstroem, Springfield, Va.

[73] Assignee: The United States of America as represented by The Secretary of the Army, Washington, D.C.

[21] Appl. No.: 551,056

[22] Filed: Oct. 31, 1995

[51] Int. Cl.⁶ .............. G02B 5/18; G02B 27/44; H01S 3/10; H01J 3/14
[52] U.S. Cl. .............. 359/569; 359/566; 372/20; 250/216
[58] Field of Search .............. 359/7, 15, 565, 359/566, 568, 569, 571; 385/36, 37; 250/216; 372/20

[56] References Cited

U.S. PATENT DOCUMENTS

| | | | |
|---|---|---|---|
| 4,909,587 | 3/1990 | Okamoto et al. | 385/37 |
| 4,909,609 | 3/1990 | McDowell | 385/116 |
| 5,153,425 | 10/1992 | Meinzer et al. | 250/216 |
| 5,387,484 | 2/1995 | Doany et al. | 430/5 |
| 5,495,101 | 2/1996 | Sharp et al. | 250/216 |

*Primary Examiner*—Paul M. Dzerzynski
*Assistant Examiner*—Audrey Chang
*Attorney, Agent, or Firm*—Milton W. Lee; John E. Holford; Alain L. Bashore

[57] ABSTRACT

An arrangement and technique for reduced laser induced damage threshold (LIDT) of a sacrificial optical element within an electro-optical system without increased system reflectivity. A sacrificial optical element including input and output surfaces is located normal to the optical axis at an intermediate focal plane of the system and a micro-prism structure is also present on at least one of the surfaces.

3 Claims, 3 Drawing Sheets

SACRIFICIAL MICRO-GRATINGS

BACKGROUND OF THE INVENTION

1. Field of the Invention

The present invention generally relates to high energy protection devices and more specifically, to a sacrificial optical element located in the optical axis that results in substantially greater system hardness, without increasing system reflectivity.

2. Description of Prior Art

To protect advanced electro-optical systems, such as forward looking infrared viewers (FLIR) from high energy radiation there has been developed devices which protect against this type of radiation. This type of protection is often referred to as laser hardening. Some of these devices depend on the existence of one or more intermediate focal planes within the optical train, where the high optical gain can be used to cause the initiation of a protection device which limits the laser energy from propagating farther down the optical train. Some devices known as "sacrificial" allow incidence laser energy to cause damage to its surface at this high-gain intermediate focal plane location, which in turn protects the remaining optical train. If this intermediate focal plane is located in front of the system scanner, then the element will have to be positioned normal to the optical axis in order to function over the entire system Field of View (FOV) in a conventional (on-axis) optical system. For a staring sensor with a 2-dimensional focal plane use of a conventional (flat and polished) optical element at this location is not allowed, as it would introduce a detrimental optical augmentation (OA) signature.

Devices called optical power limiters have been historically pursued, such as gas plasma switches and non-linear optical switches, both of which are complicated devices. For a simple sacrificial optical elements to be effective, the laser induced damage threshold (LIDT) of the element should be as low as possible. It has been commonly reported that any derivations of an optical surface from a flat polish will lower the LIDT for the surface. The reflectivity of the sacrificial optical element of the optical power limiter is also of a significant design consideration. While many of the prior art devices may protect their host systems from high energy damage, resultant reflected high energy radiation can "back out" of the optical train which can be detected by an observer who then may take an appropriate countermeasure.

While the prior art has reported using sacrificial optical elements none have established a basis for a specific apparatus that is dedicated to the task of resolving the particular problem at hand. What is needed in this instance is a sacrificial optical element with a reduced laser damage threshold, which is located normal to the optical axis, and can be inserted without increasing system reflectivity and OA signature.

SUMMARY OF THE INVENTION

It is therefore one object of the invention to provide a sacrificial optical element with a reduced laser damage threshold, which is located normal to the optical axis, and can be inserted without increasing system reflectivity and OA signature.

According to the invention, there is disclosed an arrangement and technique for reduced laser induced damage threshold (LIDT) of an electro-optical system without increased system reflectivity. A sacrificial optical element including input and output surfaces is located normal to the optical axis at an intermediate focal plane of the system. A micro-prism structure is provided on at least one of the surfaces, whereby a reduced LIDT is achieved on the order of 5 times that of a flat polished surface, and reflectance of less than 0.01 is achieved. The micro-prism structure may be a crossed-hatched structure or a crossed-grating structure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
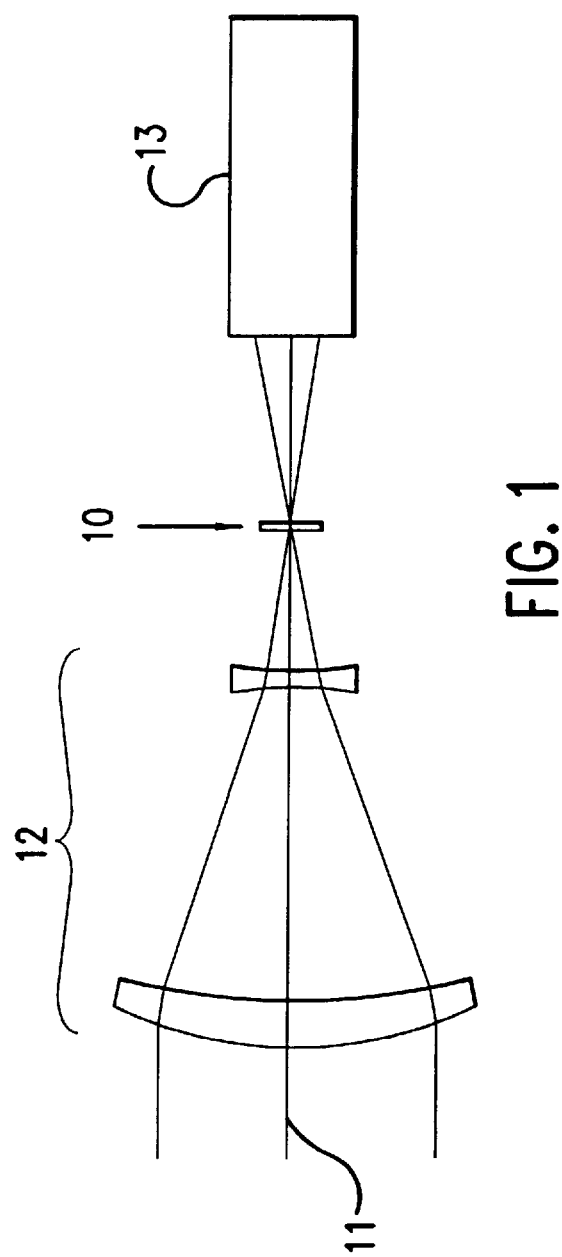
FIG. 1 is a diagram of the optical system of a FLIR system with the invention located normal to the optical axis superimposed over an optical ray trace.

Referring now to the drawings, and more particularly to FIG. 1, there is shown the optical system of a FLIR system with the sacrificial optical element 10 located normal to the optical axis 11 at an intermediate focal plane. Sacrificial optical element is also located in-between input optics 12 and remaining optics 13. Sacrificial optical element 10 includes micro-grating structure for the protection of optical and electro-optical systems from high energy radiation such as pulsed laser threats. The micro-grating of the invention allows to greatly reduce the reflectivity of the device, and enhance its laser damage threshold. A single piece of optical material (e.g. Germanium or Zinc Selenide in the infrared) is utilized, with the complete optical element 10 being placed at the intermediate focal plane. Optical element 10 would require very little space and no electrical power or control that is characteristic of past prior art devices. While the invention is not limited to a particular intermediate focal plane, sacrificial optical element 10 could be placed at the same intermediate focal plane as that at which a FLIR's Thermal Referencing is done.

Sacrificial optical element 10 includes a micro-prism structure which would vastly reduce the OA signature of the device, and also reduce its laser induced damage threshold. The micro-prism structure could be produced by utilizing a variety of known technologies including binary or other photolithographic etching techniques, or conventional mechanical ruling. A further description of the various techniques to manufacture the surface may be found in: "Conference on Binary Optics: An Opportunity for Technical Exchange" (proceedings of conference held Feb. 23–25, 1993 at Huntsville, Ala.); edited by Helen J. Cole et al.; National Aeronautics and Space Administration (NASA Conference Publication 3227); 1993.

FIG. 2 is a cut-a-way side view of the micro-grating of the sacrificial optical element of the invention superimposed over an optical ray trace. Optical element 20 is shown with micro-prism structure 21 and 22 on both sides. In the preferred embodiment, optical element 20 would be less than 1 mm in thickness. The structure 21, while highly transmissive, would be fashioned with a micro-grating designed to direct any reflected light away from the input optics. Structure 22 is also highly transmissive, having a similar micro-prism structure to re-align input optical bundle 23 along the optical axis to an output optical bundle 24. The optical cone subtends an angle of $\phi$.

Figure 2A:
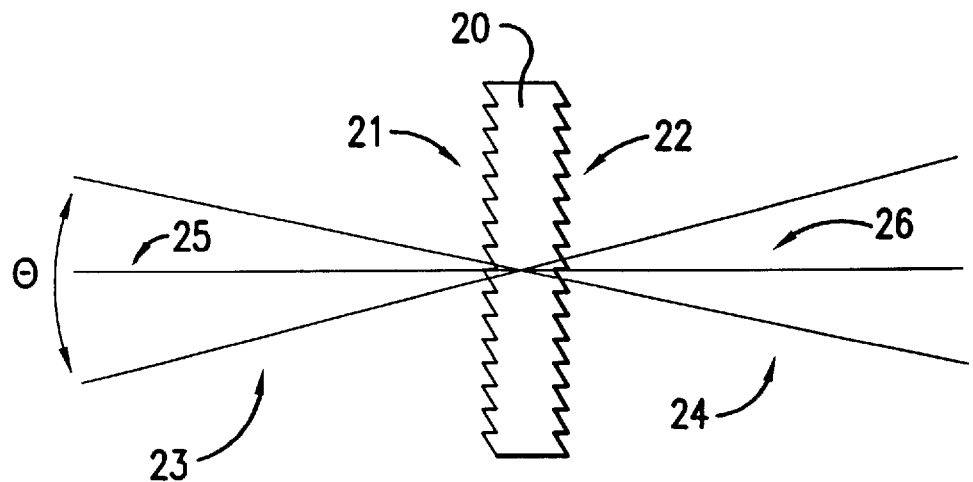
FIG. 2a is a cut-a-way side view of the micro-grating of the sacrificial optical element of the invention superimposed over an optical ray trace.
Figure 2B:
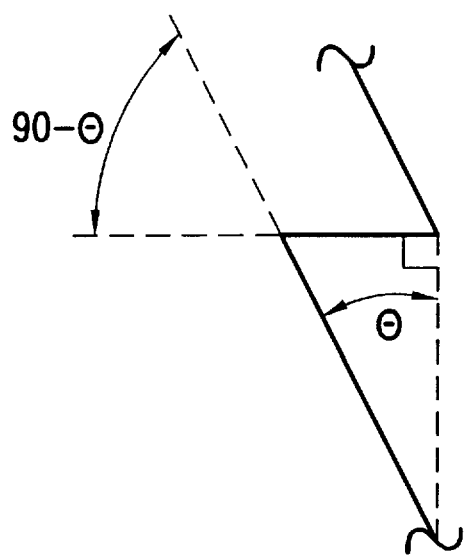
FIG. 2b is a partial view of one micro-prism element of the micro-grating.

FIG. 2b is a partial view of one micro-prism element of the micro-prism surface of the embodiment shown in FIG. 2a. In FIG. 2b, the grating's blaze angle $\theta$ would be designed to not reflect light back out the optical train. To meet this requirement, the blaze angle must be greater than $\phi/2$. In addition, the micro-prism surface must be designed to strike a good compromise between transmitted and reflected diffraction efficiency. While making the optical element as thin as practical should minimize "color" problems, structure 22 of FIG. 2a can also be specifically designed to compensate for chromatic aberrations introduced by structure 21. Structure 22 also needs to realign the outgoing optical axis (26) to be parallel to the incoming optical axis (25). The element would be placed with one of the surfaces at or near an intermediate focal plane. The presence of a micro-optical structure near the focus will substantially decrease the laser induced damage threshold of the device (below that of a flat, polished surface), thus making it more effective in its role.

Figure 3:
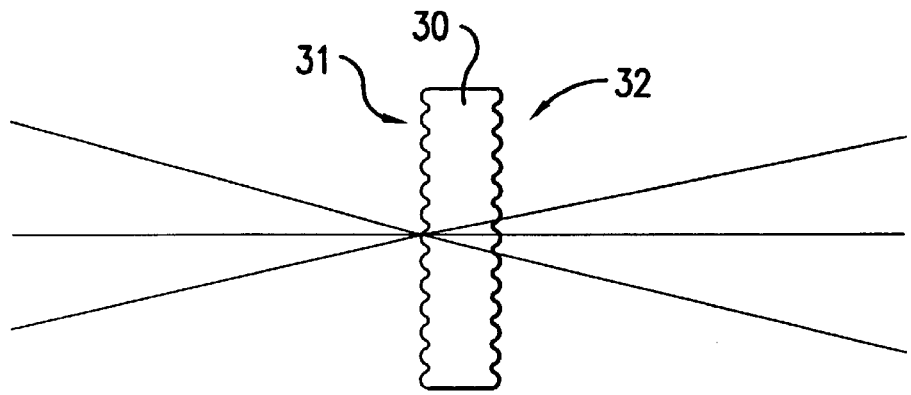
FIG. 3 is a cut-a-way side view of a second embodiment of the micro-grating of the sacrificial optical element of the invention superimposed over an optical ray trace.

FIG. 3 is a cut-a-way side view of a second embodiment of the micro-grating of the sacrificial optical element of the invention superimposed over an optical ray trace. Optical element 30 includes micro-prism structure 31 and 32. In this second embodiment, optical element 30 is less than 1 mm in thickness. Micro-prism structure 31 and 32 are described as Crossed-Grating Structures (CGS), also known in the prior art as "Moth's Eye". Optical element 30 is designed for extremely low reflectivity at the threat laser wavelengths, and therefore can be placed at or very near an intermediate focal plane and used as a sacrificial optical element.

Figure 4:
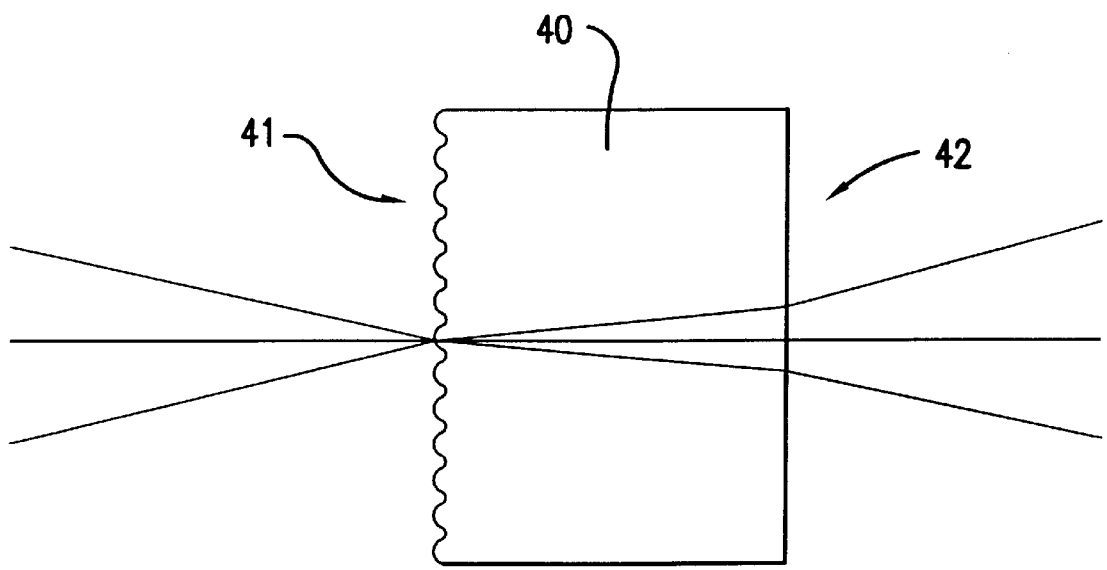
FIG. 4 is a cut-a-way side view of a third embodiment of the micro-grating of the sacrificial optical element of the invention superimposed over an optical ray trace.

FIG. 4 is a cut-a-way side view of a third embodiment of the micro-grating of the sacrificial optical element of the invention superimposed over an optical ray trace. Optical element 40 includes structure 41 as a CGS type structure described in FIGS. 2a and 2b, and a conventional Anti-Reflection (AR) coating on surface 42. In this third embodiment, optical element 40 would likely be more than 5 mm in thickness. The thickness of optical element 40 allows use of a lesser quality conventional AR coating on the surface which is far out of focus. The CGS as structure 41 would be at or near an intermediate focal plane. In this embodiment, there is moved the second surface of the sacrificial optic out of the focal plane and allows use of a less expensive conventional AR coating without introducing a reflectance problem from this surface.

A second generation scanning FLIR is utilized in a working embodiment, with a laser threat of a 70 $\mu$ pulse $CO_2$ TEA laser pulse. The first described embodiment is placed at the first intermediate focal plane of the FLIR and these results in Peak transmitted energy density being limited with a reduction of reflectance. It is characteristic of the invention, regardless of the specific embodiment utilized, that a reduction in the LIDT of the sacrificial optical element on the order of 5 times that of a polished surface is expected and reduction in reflectance of less than 0.01 is achieved.

While this invention has been described in terms of preferred embodiment consisting of the optical elements disclosed, those skilled in the art will recognize that the invention can be practiced with modification within the spirit and scope of the appended claims.

Having thus described my invention, what I claim as new and desire to secure by Letters Patent is as follows:

1. An arrangement for reduced laser induced damage threshold (LIDT) of an electro-optical system without increased system reflectivity comprising:

a transmissive sacrificial optical element including input and output surfaces, located normal to the optical axis at an intermediate focal plane of an electro-optical system;

a micro-prism structure means on at least one of said input and output surfaces, whereby a reduced LIDT is achieved on the order of 5 times that of a flat polished surface, and reflectance of less than 0.01 is achieved.

2. The arrangement of claim 1 wherein the micro-prism structure means on at least one of said input and output surfaces further includes a crossed-grating structure.

3. A technique for reducing laser induced damage threshold (LIDT) of an electro-optical system without increased reflectivity comprising:

providing a transmissive sacrificial optical element including input and output surfaces;

providing a micro-prism structure on at least one of said input and output surfaces;

inserting the transmissive sacrificial optical element at an intermediate focal plane of the system, normal to the optical axis, whereby a reduced LIDT is achieved on the order of 5 times that of a flat polished surface, and reflectance of less than 0.01 is achieved.

* * * * *